United States Patent
Chang

(10) Patent No.: US 7,837,373 B2
(45) Date of Patent: *Nov. 23, 2010

(54) OPTICAL PLATE HAVING ENCIRCLING PROTRUSIONS AND ELONGATED V-SHAPED PROTRUSIONS AND BACKLIGHT MODULE USING THE SAME

(75) Inventor: Shao-Han Chang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

This patent is subject to a terminal disclaimer.

(21) Appl. No.: 11/843,669

(22) Filed: Aug. 23, 2007

(65) Prior Publication Data

US 2008/0266898 A1 Oct. 30, 2008

(30) Foreign Application Priority Data

Apr. 29, 2007 (CN) .................. 2007 1 0200558

(51) Int. Cl.
*F21V 7/09* (2006.01)
(52) U.S. Cl. .................. 362/607; 362/609; 362/333; 362/619; 362/620
(58) Field of Classification Search .................. 362/339, 362/606, 620, 626, 615, 607, 26, 97, 561, 362/625, 628, 608, 600, 612, 619, 246, 330, 362/555, 617, 609, 245, 247, 241, 27, 340, 362/337–338, 520–522, 511, 97.1–97.4, 362/308–309, 310, 311.01–311.15, 347–348, 362/333; 385/146, 901; 349/65; 359/831, 359/837, 599

See application file for complete search history.

(56) References Cited

U.S. PATENT DOCUMENTS

| | | | | | |
|---|---|---|---|---|---|
| 2,732,488 | A | * | 1/1956 | Wince | 362/309 |
| 3,532,871 | A | * | 10/1970 | Shipman | 362/506 |
| 4,371,916 | A | * | 2/1983 | De Martino | 362/511 |
| 6,669,350 | B2 | * | 12/2003 | Yamashita et al. | 362/612 |
| 7,254,308 | B2 | * | 8/2007 | Yu et al. | 385/146 |
| 7,422,357 | B1 | * | 9/2008 | Chang | 362/602 |
| 2002/0163790 | A1 | * | 11/2002 | Yamashita et al. | 362/31 |
| 2003/0156328 | A1 | * | 8/2003 | Goto et al. | 359/599 |
| 2005/0024744 | A1 | * | 2/2005 | Falicoff et al. | 359/737 |
| 2005/0078483 | A1 | * | 4/2005 | Bernard et al. | 362/327 |

(Continued)

FOREIGN PATENT DOCUMENTS

JP 2003297126 A * 10/2003

OTHER PUBLICATIONS

English Abstract of Japanese Publication JP 2003297126 A.*

*Primary Examiner*—Thomas M Sember
(74) *Attorney, Agent, or Firm*—Frank R. Niranjan

(57) ABSTRACT

An exemplary optical plate includes at least one transparent plate unit. The transparent plate unit includes a first surface, a second surface, a plurality of encircling protrusions, a plurality of elongated V-shaped protrusions and a lamp-receiving portion. The second surface is opposite to the first surface. The encircling protrusions are formed at the first surface. The elongated V-shaped protrusions are formed at the second surface. The lamp-receiving portion is defined in one of the first surface and the second surface. A backlight module using the optical plate is also provided.

15 Claims, 10 Drawing Sheets

U.S. PATENT DOCUMENTS

2005/0196122 A1* 9/2005 Tseng ..................... 385/146
2006/0291183 A1* 12/2006 Nishiyama et al. ........... 362/26
2007/0063338 A1* 3/2007 Chang et al. ................ 257/714
2008/0198469 A1* 8/2008 Yuba et al. ................. 359/599

* cited by examiner

OPTICAL PLATE HAVING ENCIRCLING PROTRUSIONS AND ELONGATED V-SHAPED PROTRUSIONS AND BACKLIGHT MODULE USING THE SAME

CROSS-REFERENCE TO RELATED APPLICATIONS

This application is related to eight copending U.S. patent applications, which are: application Ser. No. 11/835,425, filed on Aug. 8, 2007, and entitled "OPTICAL PLATE AND BACKLIGHT MODULE USING THE SAME"; application Ser. No. 11/835,426, filed on Aug. 8, 2007, and entitled "OPTICAL PLATE AND BACKLIGHT MODULE USING THE SAME"; application Ser. No. 11/835,427, filed on Aug. 8, 2007, and entitled "OPTICAL PLATE AND BACKLIGHT MODULE USING THE SAME"; application Ser. No. 11/835,428, filed on Aug. 8, 2007, and entitled "OPTICAL PLATE AND BACKLIGHT MODULE USING THE SAME"; application Ser. No. 11/835,429, filed on Aug. 8, 2007, and entitled "OPTICAL PLATE AND BACKLIGHT MODULE USING THE SAME"; application Ser. No. 11/835,430, filed on Aug. 8, 2007, and entitled "OPTICAL PLATE AND BACKLIGHT MODULE USING THE SAME"; application Ser. No. 11/835,431, filed on Aug. 8, 2007, and entitled "OPTICAL PLATE AND BACKLIGHT MODULE USING THE SAME"; and application Ser. No. 11/843,670, filed on Aug. 26, 2007, and entitled "OPTICAL PLATE AND BACKLIGHT MODULE USING THE SAME". In all these copending applications, the inventor is Shao-Han Chang. All of the copending applications have the same assignee as the present application. The disclosures of the above identified applications are incorporated herein by reference.

BACKGROUND OF THE INVENTION

1. Field of the Invention

The present invention relates to an optical plate for use in, for example, a backlight module, the backlight module typically being employed in a liquid crystal display (LCD).

2. Discussion of the Related Art

In a liquid crystal display device, liquid crystal is a substance that does not itself radiate light. Instead, the liquid crystal relies on light received from a light source, in order that the liquid crystal can facilitate the displaying of images and data. In the case of a typical liquid crystal display device, a backlight module powered by electricity supplies the needed light.

FIG. 10 represents a typical direct type backlight module 100. The backlight module 100 includes a housing 101, a light reflective plate 102, a light diffusion plate 103, a prism sheet 104, and a plurality of light emitting diodes 105 (hereinafter called LED). The housing 101 includes a rectangular base 1011 and four sidewalls 1013 extending from a periphery of the base 1011. The base 1011 and the four sidewalls 1013 cooperatively define a chamber 107. Each LED 105 includes a base portion 1053 and a light-emitting portion 1051 disposed on the base portion 1053. The LEDs 105 are electrically connected to a printed circuit board (not labeled), and the printed circuit board is fixed to the base 1011 of the housing 101. The light reflective plate 102 is disposed on the LEDs 105 in the chamber 107. The light reflective plate 102 defines a plurality of through holes (not labeled) that allows the light-emitting portions 1051 of the LED 105 to pass through and to emit light to be transmitted to the light diffusion plate 103. The light diffusion plate 103 and the prism sheet 104 are stacked in that order on the chamber 107. Light emitted from the LEDs 105 is substantially reflected by the light reflective sheet 102 to enter the light diffusion plate 103, and diffused uniformly in the light diffusion plate 103, and finally surface light is outputted from the prism sheet 104.

Generally, a plurality of dark areas may occur because of a reduced intensity of light between adjacent LEDs 105. In the backlight module 100, each LED 105 further includes a reflective sheet 106 disposed on the top of the light-emitting portion 1051, configured for decreasing the brightness of a portion of the backlight module 100 above the LED 105. However, the brightness of the backlight module 100 is still not uniform. One method of enhancing the uniformity of brightness of the backlight module 100 is to increase the space between the light diffusion plate 103 and the LEDs 105. This increase in space tends to eliminate dark areas. However, increasing the space between the diffusion plate 103 and the LEDs 105 will also increase the thickness of the backlight module 100, and the further overall intensity of the output light rays is reduced.

What is needed, therefore, is a new optical plate and a backlight module using the optical plate that can overcome the above-mentioned shortcomings.

SUMMARY

An optical plate according to a preferred embodiment includes at least one transparent plate unit. The transparent plate unit includes a first surface, a second surface, a plurality of encircling V-shaped protrusions, a plurality of elongated V-shaped protrusions and a lamp-receiving portion. The second surface is opposite to the first surface. The encircling protrusions are formed at the first surface. The elongated V-shaped protrusions are formed at the second surface. The lamp-receiving portion is defined in one of the first surface and the second surface.

A backlight module according to a preferred embodiment includes a housing, at least one side-lighting type light emitting diode, an optical plate, and a light diffusion plate. The housing includes a base and a plurality of sidewalls extending from a periphery of the base, the base and the sidewalls cooperatively forming an opening. The at least one light emitting diode is disposed on the base, each light emitting diode having a light-emitting portion. The same optical plate as described in the previous paragraph is employed in this embodiment. The light-emitting portion of the at least one light emitting diode is inserted in the lamp-receiving portion of the optical plate correspondingly. The light diffusion plate is disposed on the housing over the opening.

Other advantages and novel features will become more apparent from the following detailed description of various embodiments, when taken in conjunction with the accompanying drawings.

BRIEF DESCRIPTION OF THE DRAWINGS

The components in the drawings are not necessarily drawn to scale, the emphasis instead being placed upon clearly illustrating the principles of the present optical plate and backlight module. Moreover, in the drawings, like reference numerals designate corresponding parts throughout several views, and all the views are schematic.

DETAILED DESCRIPTION OF THE PREFERRED EMBODIMENTS

Reference will now be made to the drawings to describe preferred embodiments of the present optical plate and backlight module, in detail.

Figure 1:
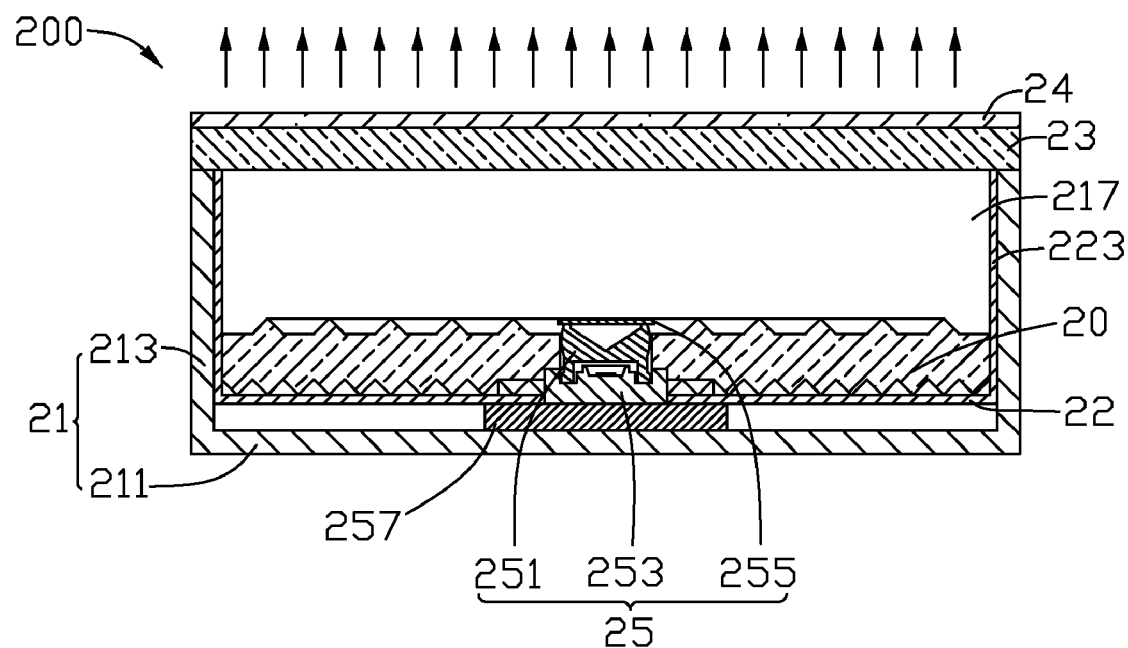
FIG. 1 is a side cross-sectional view of a backlight module using an optical plate according to a first preferred embodiment of the present invention.

Referring to FIG. 1, a backlight module 200 in accordance with a first preferred embodiment is shown. The backlight module 200 includes a housing 21, a light reflective plate 22, a light diffusion plate 23, a side-lighting type LED 25, and an optical plate 20. The housing 21 includes a rectangular base 211 and four sidewalls 213 extending around a periphery of the base 211. The sidewalls 213 cooperatively form an opening 217. The light diffusion plate 23 is disposed on the housing 21 over the opening 217. The optical plate 20, the light reflective plate 22 and the LED 25 are received in the housing 21.

Figure 2:
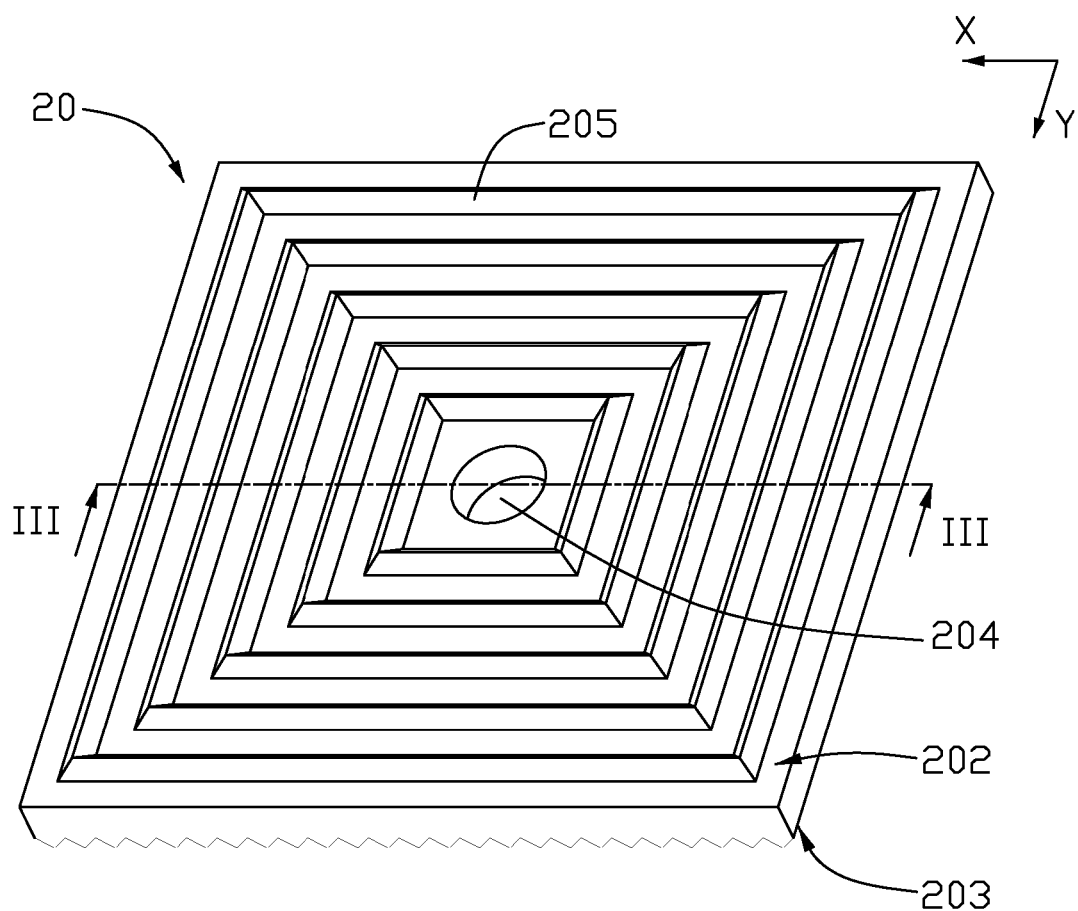
FIG. 2 is an isometric view of the optical plate of FIG. 1.
Figure 3:
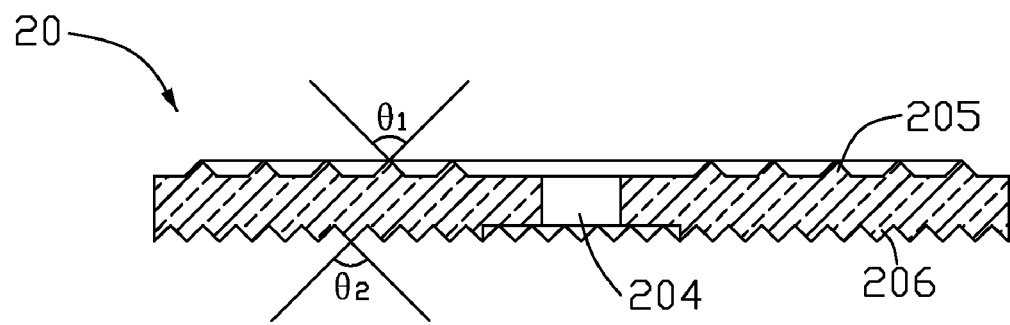
FIG. 3 is a cross-sectional view taken along line III-III of FIG. 2.
Figure 4:
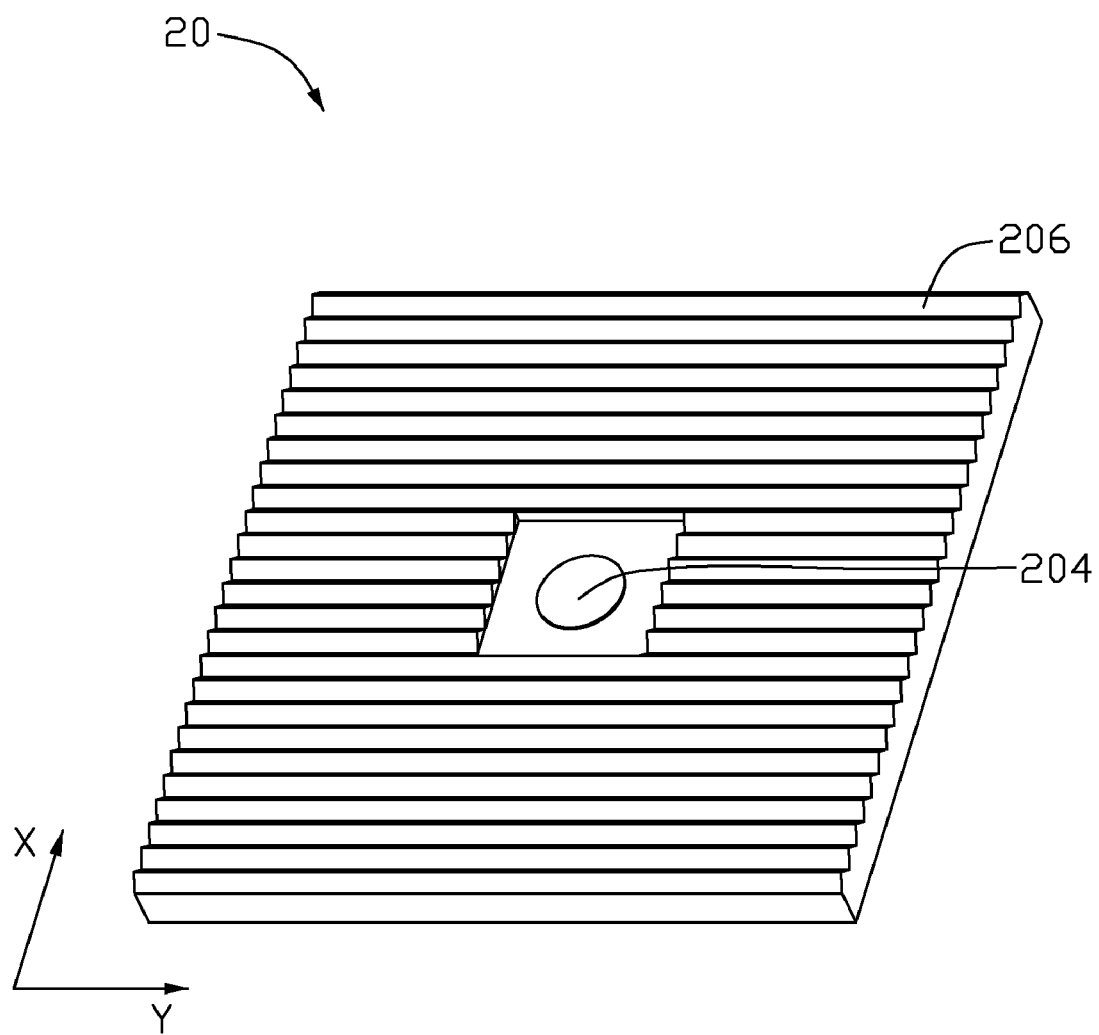
FIG. 4 is similar to FIG. 2, but viewed from another aspect.

Referring to FIGS. 2 through 4, the optical plate 20 is a transparent square plate, and can be mounted into the housing 21. The optical plate 20 includes a light output surface 202, and a bottom surface 203 in another side of the optical plate 20 opposite to the light output surface 202. The light output surface 202 is a flat surface. A plurality of looped V-shaped protrusions 205 are formed on the light output surface 202. A plurality of elongated V-shaped protrusions 206 are formed on the bottom surface 203. The optical plate 20 further includes a lamp-receiving portion 204 defined in a center of the bottom surface 203. In this embodiment, the lamp-receiving portion 204 is a through hole that communicates between the light output surface 202 and the bottom surface 203. The optical plate 20 can be made from material selected from the group consisting of polycarbonate (PC), polymethyl methacrylate (PMMA), polystyrene (PS), copolymer of methylmethacrylate and styrene (MS), and any suitable combination thereof.

Referring to FIG. 2, the looped V-shaped protrusion 205 is substantially a squared loop that surrounds the lamp-receiving portion 204. Top tips of the plurality of looped V-shaped protrusions 205 are positioned in a plane parallel to the light output surface 202. A pitch between adjacent looped V-shaped protrusions 205 along an X-axis direction or a Y-axis direction is configured to be in a range from about 0.025 millimeters to about 2 millimeters. Referring to FIG. 3, a vertex angle $\theta_1$ defined by two opposite side surfaces of each of the looped V-shaped protrusions 205 is configured to be, preferably, in a range from about 60 degrees to about 120 degrees.

Referring to FIG. 4, each elongated V-shaped protrusion 206 extends along a direction parallel to the X-axis, and the elongated V-shaped protrusions 206 connect with each other. Likewise, a pitch of between adjacent elongated V-shaped protrusions 206 is configured to be, preferably, in a range from about 0.025 millimeters to about 2 millimeters. Referring to FIG. 3, a vertex angle $\theta_2$ of each of the elongated V-shaped protrusions 206 is configured to be, preferably in a range from about 60 degrees to about 120 degrees.

Referring to FIGS. 1 and 2, the side-lighting type LED 25 includes a base portion 253, a light-emitting portion 251 disposed on the base portion 253, and a reflective member 255 disposed on the top of the light-emitting portion 251. The LED 25 is electrically connected to a printed circuit board 257 that is fixed to the base 211 of the housing 21. The light-emitting portion 251 of the LED 25 is inserted into the lamp-receiving portion 204 of the optical plate 20 with the light output surface 202 of the optical plate 20 facing the light diffusion plate 23. The light reflective plate 22 defines a through hole (not labeled). The light reflective plate 22 is disposed underneath the bottom surface 203 of the optical plate 20 and the LED 25 is passed through the light reflective plate 22 via the through hole.

Light emitted from the light-emitting portion 251 of the LED 25 enters the optical plate 20 via an inner surface of the lamp-receiving portion 204. A significant amount of light enters the optical plate 20. Since the elongated V-shaped protrusions 206 have a plurality of curved side surfaces, a great amount of light is directly reflected by the elongated V-shaped protrusions 206 and exits from the light output surface 202 quickly.

In addition, the looped V-shaped protrusions 205 can condense and collimate emitted light, thereby improving a brightness of the backlight module 200. Furthermore, because the side-lighting type LED 25 is positioned in the lamp-receiving portion 204, light is uniformly outputted from the light output surface 202 of the optical plate 20 except that the portion above the LED 25 has a relatively low light output. Light exiting the optical plate 20 can be further substantially mixed in a chamber between the optical plate 20 and the light diffusion plate 23, and finally uniform surface light is outputted from the light diffusion plate 23. A distance from the LED 25 to the light diffusion plate 23 may be configured to be very small, with little or no risk of having dark areas on the portion of the backlight module 200 directly above the LED 25. Accordingly, the backlight module 200 can have a thin configuration while still providing good, uniform optical performance.

It should be pointed out that, the light reflective plate 22 can be omitted. In an alternative embodiment, a high reflectivity film can be deposited on inner surface of the base 211 and the sidewalls 213 of the housing 21. In another alternative embodiment, the housing 21 is made of metal materials, and has high reflectivity inner surfaces.

It is to be understood that, in order to improve brightness of the backlight module 200 within a specific viewing range, the backlight module 200 can further include a prism sheet 24 disposed on the light diffusion plate 23. In addition, in order to improve light energy utilization rate of the backlight module 200, there is further four reflective sidewalls 223 extending around a periphery of the light reflective plate 22 and in contact with the corresponding sidewalls 213 of the housing 21. Furthermore, the rows or columns of the microstructures 206 may not be parallel to the edges of the optical plate but have other alignments or orientations.

Figure 5:
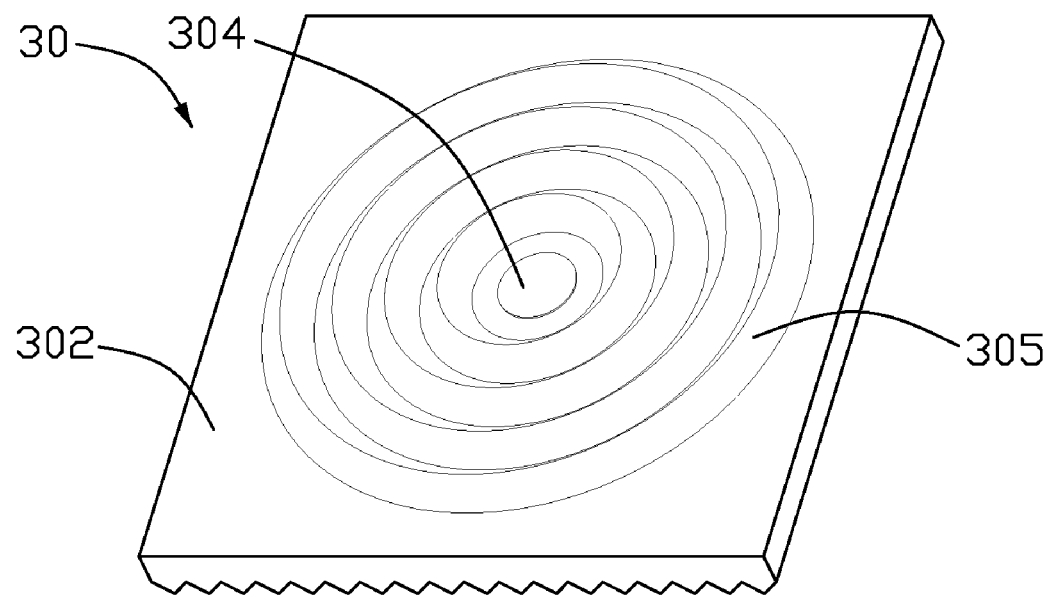
FIG. 5 is an isometric view of an optical plate according to a second preferred embodiment of the present invention.

Referring to FIG. 5, an optical plate 30 in accordance with a second preferred embodiment is shown. The optical plate 30 is similar in principle to the optical plate 20 of the first embodiment, however each of V-shaped protrusions 305 on a light output surface 302 of the optical plate 30 is substantially a round loop that surrounds the lamp-receiving portion 304.

Figure 6:
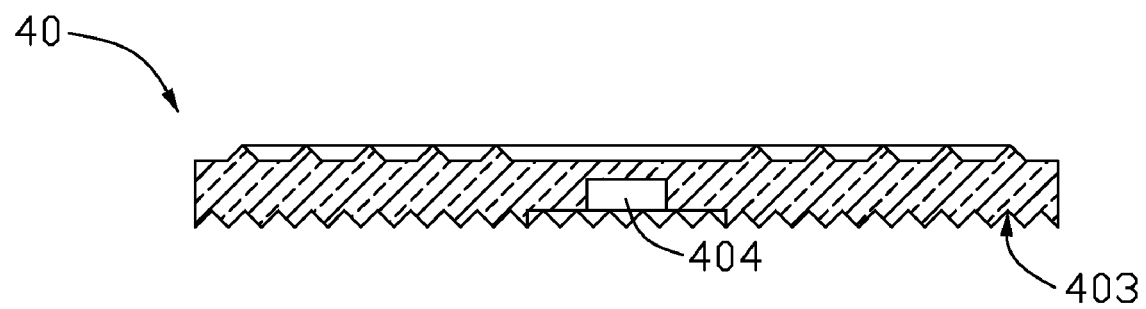
FIG. 6 is a side cross-sectional view of an optical plate according to a third preferred embodiment of the present invention.

Referring to FIG. 6, an optical plate 40 in accordance with a third preferred embodiment is shown. The optical plate 40 is similar in principle to the optical plate 20 of the first embodiment, however the lamp-receiving portion 404 defined in the bottom surface 403 of the optical plate 40 is a blind hole. It should be pointed out that, a side-lighting type LED (not shown) without a reflective member can be mounted into a lamp-receiving portion 404 of the optical plate 40 to form a backlight module. Alternatively, a reflective member of the LED can be also positioned on a center of the optical plate 40 above the lamp-receiving portion 404.

Figure 7:
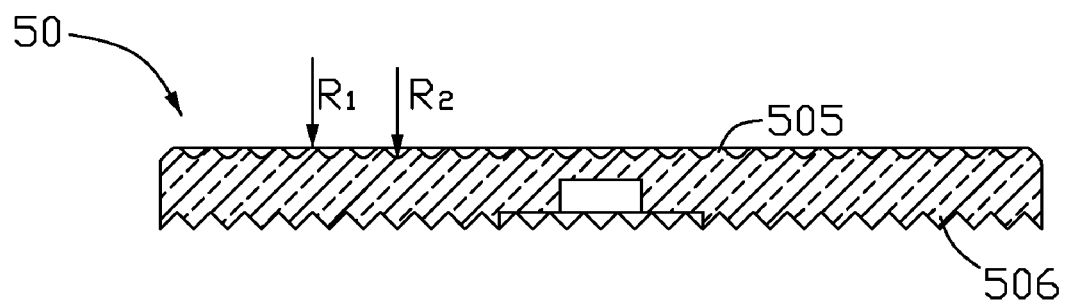
FIG. 7 is a side cross-sectional view of an optical plate according to a fourth preferred embodiment of the present invention.

Referring to FIG. 7, an optical plate 50 in accordance with a fourth preferred embodiment is shown. The optical plate 50 is similar in principle to the optical plate 40, except that either a top edge of each V-shaped protrusion 505 or a bottom edge defined by the boundary formed by the bases of two adjacent V-shaped protrusions 505 are rounded. The curvature of this rounded surface is defined by a sphere of radius R. The radius $R_1$ of the rounded top edge and the radius $R_2$ of the rounded bottom edge are equal to or less than 1.1 millimeters and greater than zero. It is to be understood that, a top edge defined by two opposite side surfaces of each elongated V-shaped protrusion 506 of the optical plate 50 or a bottom edge defined by two adjacent elongated V-shaped protrusions 506 of the optical plate 50 can be also rounded.

Figure 8:
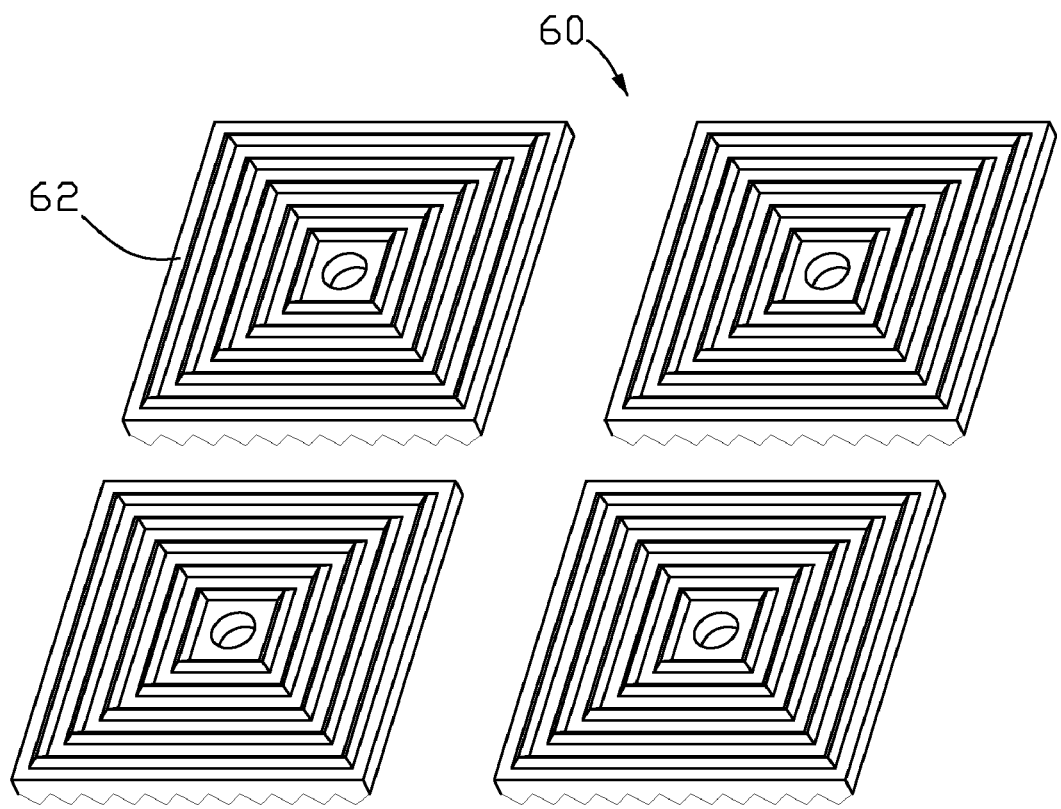
FIG. 8 is an exploded, isometric view of an optical plate according to a fifth preferred embodiment of the present invention.

Referring to FIG. 8, a combined optical plate 60 in accordance with a fifth preferred embodiment is shown. The optical plate 60 includes four transparent plate units 62. Each transparent plate unit 62 is the same as the optical plate 20 of the first embodiment. The four transparent plate units 62 can be combined with each other to form the combined optical plate 60. It is to be understood that four side-lighting type LEDs and the combined optical plate 60 can be mounted into a housing to form a larger size backlight module.

Figure 9:
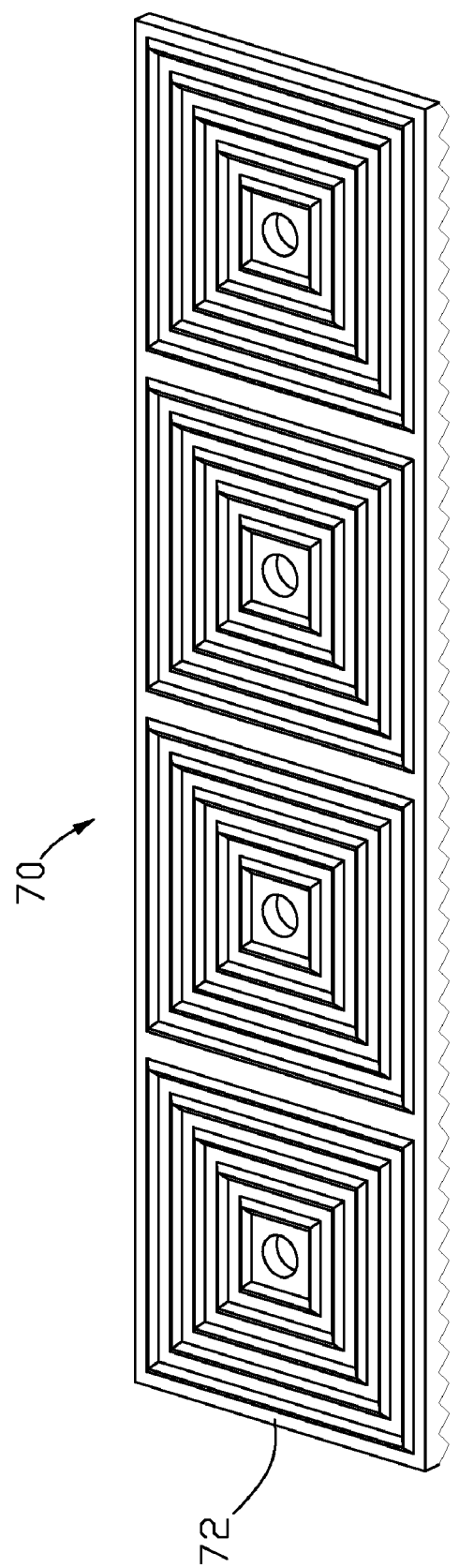
FIG. 9 is an isometric view of an optical plate according to a sixth preferred embodiment of the present invention.
Figure 10:
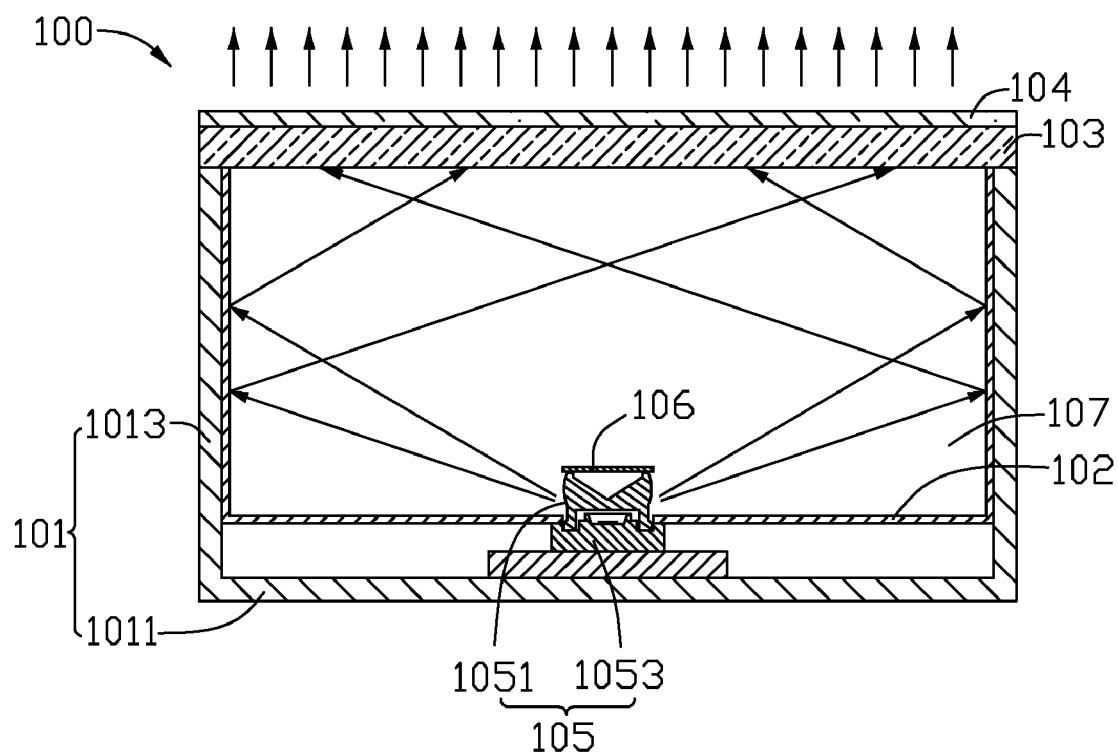
FIG. 10 is a side cross-sectional view of a conventional backlight module.

Referring to FIG. 9, another combined optical plate 70 in accordance with a sixth preferred embodiment is shown. The optical plate 70 includes four transparent plate units 72 combining as a unification with no gap therebetween. That is the four transparent plate units 72 of optical plate 70 are integrally formed with each other.

It should be noted that, in the backlight module 200, not only the optical plate 20 can be positioned in the housing 21 with the light output surface 202 facing the light diffusion plate 23, but also the optical plate 20 can be positioned in the housing 21 with the bottom surface 203 facing the light diffusion plate 23. That is, the looped V-shaped protrusions 205 are formed at a flat first surface of the optical plate 20, and the elongated V-shaped protrusions 206 are formed at a second surface of the optical plate 20. The flat first surface is selected from one of the light output surface 202 and the bottom surface 203, and the second surface is selected from the other one of the light output surface 202 and the bottom surface 203.

Furthermore, in order to increase brightness of light illumination provided by the backlight module, or mix different wavelength light rays generated by different light emitting diodes to produce white light, in above optical plate, each transparent plate unit can includes a plurality of lamp-receiving portions for receiving the point light sources.

Finally, while various embodiments have been described and illustrated, the invention is not to be construed as being limited thereto. Various modifications can be made to the embodiments by those skilled in the art without departing from the true spirit and scope of the invention as defined by the appended claims.

What is claimed is:

1. An optical plate comprising:
   at least one transparent plate section having:
     a single planar first surface;
     a second surface opposite to the first surface;
     a plurality of looped V-shaped protrusions formed at the first surface, all top tips of each of the plurality of looped V-shaped protrusions being positioned in one plane parallel to the first surface;
     a plurality of elongated V-shaped protrusions formed at the second surface; and
     at least a lamp-receiving portion defined in at least one of the first surface and the second surface, wherein the lamp-receiving portion is selected from one of blind hole and through hole communicating with the first surface and the second surface, wherein each looped V-shaped protrusion surrounds the lamp-receiving portion and the lamp-receiving portion is located at a center of the looped V-shaped protrusions.

2. The optical plate according to claim 1, wherein each of the looped V-shaped protrusions is one of a polygon and a round in shape.

3. The optical plate according to claim 1, wherein a pitch between adjacent looped V-shaped protrusions is in a range from about 0.025 millimeters to about 2 millimeters, and a vertex angle of each of the looped V-shaped protrusions is in a range from about 60 degrees to about 120 degrees.

4. The optical plate according to claim 1, wherein each of the elongated V-shaped protrusions extends along a direction parallel to a side surface of the optical plate, and the elongated V-shaped protrusions connect with each other.

5. The optical plate according to claim 1, wherein a pitch between adjacent elongated V-shaped protrusions is in a range from about 0.025 millimeters to about 2 millimeters, and a vertex angle of each of the elongated V-shaped protrusions is in a range from about 60 degrees to about 120 degrees.

6. The optical plate according to claim 1, wherein one or more of top edge of each looped V-shaped protrusion or elongated V-shaped protrusion, and bottom edge defined by the boundary formed by the bases of two adjacent looped V-shaped protrusions or two adjacent elongated V-shaped protrusions, are rounded.

7. The optical plate according to claim 6, wherein the radius of the rounded top edge and the radius of the rounded bottom edge are equal to or less than 1.1 millimeters and greater than zero.

8. The optical plate according to claim 1, wherein the optical plate includes a plurality of the transparent plate units, the transparent plate units being combined with each other.

9. A backlight module comprising:
   a housing having a base and a plurality of sidewalls extending from a periphery of the base, the base and the sidewalls cooperatively defining an opening;
   at least one side-lighting type point light source disposed on the base, each point light source having a light-emitting portion;
   an optical plate positioned in the housing, the optical plate including at least one transparent plate unit having:
     a single planar first surface;
     a second surface opposite to the first surface;
     a plurality of looped V-shaped protrusions formed at the first surface, all top tips of each of the plurality of looped V-shaped protrusions being positioned in one plane parallel to the first surface;

a plurality of elongated V-shaped protrusions formed at the second surface; and a lamp-receiving portion defined in at least one of the first surface and the second surface, wherein the lamp-receiving portion is selected from one of blind hole and through hole communicating with the first surface and the second surface, each looped V-shaped protrusion surrounds the lamp-receiving portion and the lamp-receiving portion is located at a center of the looped V-shaped protrusions, wherein the light-emitting portion of the at least one point light source is inserted in the lamp-receiving portion; and a light diffusion plate disposed on the housing over the opening.

10. The backlight module according to claim 9, further comprising a light reflective plate defining a through hole therein, the light reflective plate being disposed underneath the bottom surface of the optical plate, and the point light source passing through the light reflective plate via the through hole.

11. The backlight module according to claim 10, wherein the light reflective plate further comprises a plurality of reflective sidewalls extending from a periphery thereof and contact with the sidewalls of the housing.

12. The backlight module according to claim 9, wherein the housing is made of metal materials, and has high reflectivity inner surfaces.

13. The backlight module according to claim 9, further comprising a high reflectivity film deposited on inner surfaces of the base and the sidewalls of the housing.

14. The backlight module according to claim 9, further comprising a prism sheet disposed on the light diffusion plate.

15. The backlight module according to claim 9, wherein the each of the looped V-shaped protrusions is one of a polygon and a round in shape.

* * * * *